United States Patent
Perotin

(10) Patent No.: US 10,666,553 B2
(45) Date of Patent: May 26, 2020

(54) METHOD FOR QUICK RECONFIGURATION OF ROUTING IN THE EVENT OF A FAULT IN A PORT OF A SWITCH

(71) Applicant: BULL SAS, Les Clayes-sous-Bois (FR)

(72) Inventor: Mathieu Perotin, Paris (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 15/524,475

(22) PCT Filed: Nov. 4, 2015

(86) PCT No.: PCT/EP2015/075709
§ 371 (c)(1),
(2) Date: May 4, 2017

(87) PCT Pub. No.: WO2016/071402
PCT Pub. Date: May 12, 2016

(65) Prior Publication Data
US 2017/0317923 A1    Nov. 2, 2017

(30) Foreign Application Priority Data

Nov. 5, 2014 (FR) ...................... 14 60695
Nov. 18, 2014 (FR) ...................... 14 61142

(51) Int. Cl.
*H04N 21/443* (2011.01)
*H04L 12/703* (2013.01)
(Continued)

(52) U.S. Cl.
CPC .......... *H04L 45/28* (2013.01); *H04L 41/0213* (2013.01); *H04L 41/0663* (2013.01);
(Continued)

(58) Field of Classification Search
CPC ..... H04L 41/0654; H04L 45/22; H04L 45/28; H04L 49/552; H04L 41/0213;
(Continued)

(56) References Cited

U.S. PATENT DOCUMENTS 7,120,834 B1* 10/2006 Bishara ................. H04L 49/552
 714/43
2002/0075809 A1* 6/2002 Phaal ................. H04L 41/0213
 370/245

(Continued)

OTHER PUBLICATIONS

International Search Report as issued in International Patent Application No. PCT/EP2015/075709, dated Jan. 18, 2016.

*Primary Examiner* — Salvador E Rivas
(74) *Attorney, Agent, or Firm* — Pillsbury Winthrop Shaw Pittman LLP

(57) ABSTRACT

A method for quick reconfiguration of routing in the event of a fault in a port of a switch including a plurality of ports, persistent memory for maintaining data corresponding to a routing table, and working memory for working on data corresponding to a routing table, includes: transmitting a first message to indicate a fault; independently updating the routing data only in the working memory by replacing an identifier of the port with the fault with an identifier of an operational port, the identifier of the operational port being selected locally; and transmitting a second message to indicate that the table was updated.

19 Claims, 1 Drawing Sheet

(51) Int. Cl.
*H04L 12/707* (2013.01)
*H04L 12/939* (2013.01)
*H04L 12/24* (2006.01)
*H04L 12/755* (2013.01)
*H04N 19/423* (2014.01)
*H04L 12/911* (2013.01)

(52) U.S. Cl.
CPC ........ *H04L 41/0668* (2013.01); *H04L 45/021* (2013.01); *H04L 45/22* (2013.01); *H04L 49/552* (2013.01); *H04N 19/423* (2014.11); *H04N 21/4435* (2013.01); *H04L 41/0654* (2013.01); *H04L 47/746* (2013.01)

(58) Field of Classification Search
CPC ... H04L 45/021; H04L 47/746; H04N 19/423; H04N 21/4435; G06F 11/07
See application file for complete search history.

(56) References Cited

U.S. PATENT DOCUMENTS

| | | | |
|---|---|---|---|
| 2003/0021223 A1 | 1/2003 | Kashyap | |
| 2006/0233175 A1* | 10/2006 | Ge | H04L 45/04 370/392 |
| 2008/0232347 A1 | 9/2008 | Chao et al. | |
| 2011/0202927 A1* | 8/2011 | Miloushev | G06F 9/5016 718/104 |
| 2012/0039341 A1* | 2/2012 | Latif | H04L 12/06 370/466 |
| 2012/0124238 A1* | 5/2012 | Nandagopal | H04L 45/023 709/242 |
| 2014/0075122 A1* | 3/2014 | Banikazemi | G06F 11/00 711/133 |
| 2014/0130039 A1* | 5/2014 | Chaplik | G06F 9/45558 718/1 |
| 2015/0358285 A1* | 12/2015 | Ellard | H04L 63/02 726/12 |

* cited by examiner

METHOD FOR QUICK RECONFIGURATION OF ROUTING IN THE EVENT OF A FAULT IN A PORT OF A SWITCH

CROSS-REFERENCE TO RELATED APPLICATIONS

This is the U.S. National Stage of PCT/EP2015/075709, filed Nov. 4, 2015, which in turn claims priority to French Patent Application No. 1460695, filed Nov. 5, 2014 and French Patent Application No. 1461142, filed Nov. 18, 2014, the entire contents of all applications are incorporated herein by reference in their entireties.

TECHNICAL FIELD OF THE INVENTION

The invention relates to a method for quick reconfiguration of routing in the event of a fault in a port of a switch. More specifically, the invention relates to a method for quick reconfiguration of routing in the event of a fault in a port of a switch of a network of computing nodes.

"Fault in a port" in the present document is taken to mean the change of state of a port. Such a change of state takes place, for example, for a fault in the port, but also for a fault in a hardware or software element connected to the port, such as a cable or even a logical link.

Network of computing nodes is taken to mean, within the scope of the present document, any network of machines, a machine being at least selected from: a computer, a server, a blade server, etc. Particularly targeted are clusters of servers, that is to say supercomputers or instead high performance computers. The field of high performance computing designated HPC is also targeted.

PRIOR ART

With the increasing size of supercomputers, the topologies of the corresponding networks are becoming more complex while becoming denser. Since the frequency of faults affecting the networks is dependent on the number of items of equipment, this frequency is increasing. At the same time, the items of computing equipment are being densified in such a way that the number of processor cores and the number of processors per computing node is increasing. That being the case, the impact of a fault, even conventional, or expected, such as a failure of an interconnection cable is capable of concerning a very large number of applications and inducing a failure in their execution. These occurrences, critical, are to be avoided and nevertheless they are destined to increase by the conjunction of the two factors described, namely the increase in the sizes of interconnection networks and the densification of computing means.

The technical problem is based on a temporal problematic. It concerns a problem of optimisation which aims to minimise the reaction time from the detection of the fault to its circumvention. Beyond a reaction time defined by the applicative criteria, a parallel programme will fail. On the other hand, if a circumvention solution is found and deployed before the expiry of this reaction time, the fault will be invisible for the applications affected. The action lever acts on the routing, that is to say the computation and the use of the paths that a message must follow on a network in order to reach its destination. A recalculation operation has to be launched to take into account the fault and to circumvent it, in order on the one hand to leave the support teams time to intervene and on the other hand to minimise the disrupting impact of the failure.

The increase in the size of network topologies and the number of items of equipment capable of transmitting messages is pushing existing routing algorithms to their ultimate limits. Their complexity makes their computing time soar and makes their reaction time pass beyond the attributable reaction time.

Current supercomputers manage their routing, and thus re-routing operations, in a centralised manner: a single server is responsible for the recovery of the state of the topology as well as the consequent routing decisions. This is for example the case of "OpenSM", the daemon used by Infiniband networks. This centralised approach does not scale up to the exaflop scale, or even to the scale of fifty or so petaflops. This was also the case with the MCP software component of Myrinet networks. None of these solutions:
  can be scaled up;
  offers the possibility of offering quick re-routing.

It is in fact necessary to centralise the topology on a single point of the network, then to carry out an overall computation before redeploying the updated routing tables.

DESCRIPTION OF THE INVENTION

The present invention offers a solution to make it possible to drastically reduce recovery times following a fault, passing below the detection threshold of computing applications. The types of faults covered go from the loss of a link to the loss of a router. The efficiency of the correction depends on the high performance topology and the position of the fault.

The invention implements a distribution as close as possible to the re-routing operation which enables a scaling up and makes it possible to obtain a solution that works not just with existing scales but also with future scales. For all that, this distribution, if it leads to the expected confrontation of the problematics inherent to the field, must also ideally take place as close as possible to the failure, that is to say within the router. This implementation as close as possible to the fault enables the reduction of the detection-action time to a minimum but only offers very limited resources, reducing the field of action of algorithms. It makes it possible however to provide a continuity of routing to the applications which avoids said applications defaulting.

The invention is a method that can be run directly on the control boards associated with each switch of a network. These boards are on-board computers of modest size, which are notably responsible for communication with a management network, the management of errors as well as the routing tables.

Without any other information than that accessible locally, that is to say the availability of the ports, the method according to the invention is capable of recalculating a routing, by replacing the routes which used a faulty port by a new operational route. This local information is partial, but it is sufficient to put in place an operational re-routing, in most cases.

In order to do so, one aspect of the invention relates to a method for quick reconfiguration of routing in the event of a fault in a port of a switch comprising a plurality of ports, a persistent memory for maintaining data corresponding to a routing table and a working memory for working on data corresponding to a routing table characterised in that it comprises the following steps
  Transmitting a first message to indicate a fault,
  Independently updating the routing data only in the working memory by replacing an identifier of the port with the fault with an identifier of an operational port, the identifier of the operational port being selected locally, Transmitting a second message to indicate that the table has been updated.

Apart from the main characteristics that have been mentioned in the preceding paragraph, the method/device according to the invention may have one or more additional characteristics among the following, considered individually or according to any technically possible combinations thereof:

It also comprises the following steps:
  Receiving a routing table updating message,
    Using data of the routing table updating message to update the working memory and the persistent memory, these updates being compliant with the data of the updating message.
  the operational port identifier used for the updating is selected from a set formed by identifiers of working ports of the plurality of ports.
  the operational port identifier used for the updating is selected randomly.
  the operational port identifier used for the updating is selected according to a counter corresponding to a number of updates carried out.
  the operational port identifier used for the updating is selected according to a predetermined ranking in a list of port identifiers,
  a list of ports used to select the operational port identifier is sorted.
  the sort criterion is the load of the ports.

The invention also relates to a digital storage device comprising a file corresponding to instruction codes implementing the method according to a combination of the preceding characteristics.

The invention also relates to a device implementing the method according to a combination of the preceding characteristics.

BRIEF DESCRIPTION OF THE FIGURES

Other characteristics and advantages of the invention will become clearer on reading the description that follows, with reference to the appended figures, which illustrate.

For greater clarity, identical or similar elements are marked by identical reference signs in all of the figures.

The invention will be better understood on reading the description that follows and by examining the figures that accompany it. These are presented for indicative purposes and in no way limit the invention.

DETAILED DESCRIPTION OF AN EMBODIMENT

Figure 1:
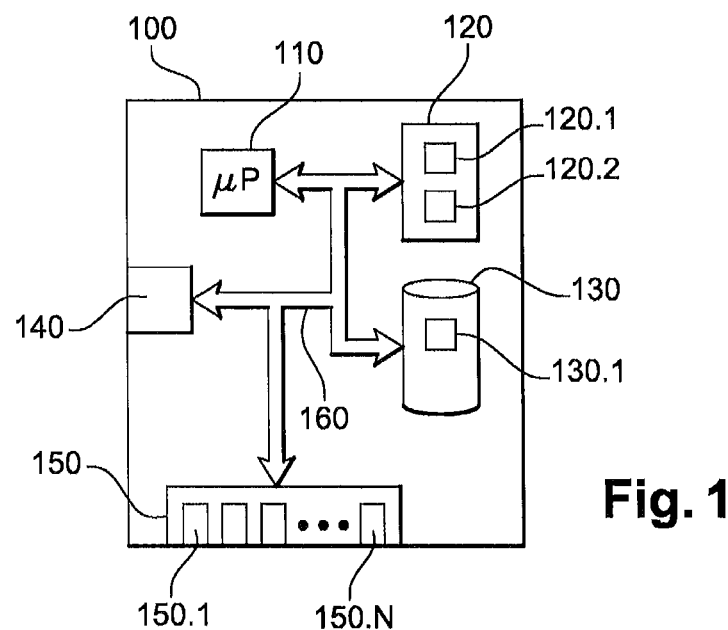
FIG. 1, a view of a switch implementing a method according to the invention.

In FIG. 1 is illustrated a device on which the invention may be implemented. FIG. 1 shows a switch 100 comprising:
  a microprocessor 110;
  a working memory 120, also called random access memory or RAM;
  a persistent memory 130, that is to say a memory capable of backing up data even in the absence of power supply, typically a flash memory is used, more rarely a SSD or conventional hard disc drive;
  a management port 140, in general it is an Ethernet port;
  a plurality 150 of working ports 150.$i$, in general they are InfiniBand ports.

The microprocessor 110 of the switch 100, the working memory 120 of the switch 100, the persistent memory 130 of the switch 100, the management port 140 of the switch 100 and the plurality 150 of working ports of the switch 100 are interconnected by at least one bus 160.

When an action is ascribed to a device it is in fact carried out by a microprocessor of the device controlled by instruction codes saved in a memory of the device. If an action is ascribed to an application, it is in fact carried out by a microprocessor of the device in a memory of which the instruction codes corresponding to the application are saved.

FIG. 1 shows that the persistent memory 130 comprises at least one routing table zone 130.1 comprising a plurality of routing recordings. A routing recording is composed of at least two fields
  a destination identifier field,
  a port identifier field.

A switch receives messages via a port and retransmits them via another port. This other port is determined by crossing at least one characteristic of a message with the recordings of the routing table. A message is at least characterised by a recipient information. This recipient information makes it possible to find a recording in the routing table. The recording found makes it possible to determine via which port the message must be retransmitted.

FIG. 1 shows that the working memory 120 comprises several zones of which at least:
  a routing table zone 120.1, it is a copy of the routing table of the persistent memory, the accesses to this working memory are quick but this working memory is not capable of backing up data without power supply, the microprocessor thus loads the data from the persistent memory into the working memory, similarly when the processor wishes to save data in the persistent memory, it firstly writes it in the working memory;
  a port status zone 120.2 in which are saved the port status recordings, a port status recording comprising at least two fields:
    A first port identifier field,
    A second port status field, a status being chosen from among the list formed of at least: "operational", "faulty"

It may be noted here that a port may be faulty for various reasons:
  Defect at the level of the port,
  Defect at the level of a cable connected to the port,
  Absence of cable,
  The list is not exhaustive.

Figure 2:
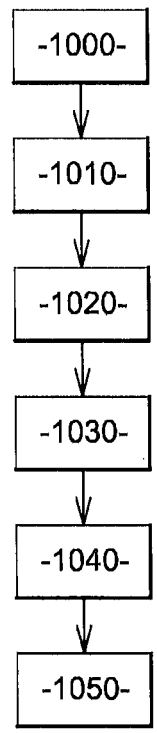
FIG. 2, an illustration of steps of the method according to the invention.

FIG. 2 shows a preliminary step 1000 in which a failure takes place at the level of a port 150.$i$ of the plurality 150 of ports. Such a fault causes, in a known manner, the implementation, by the switch 100 of a signalling step 1010. The present invention modifies this signalling step to add thereto connection instructions to steps specific to the invention. A failure, or fault, may be due to the port itself, but also to a cable connected to the port, to another port connected to the port, to a link failure, that is to say a software problem making the port unusable . . . the list is not exhaustive In the signalling step 1010 the switch 100 produces and transmits a first signalling message via the management port 140. The first signalling message is a message according to the Simple Network Management Protocol (SNMP), for example a TRAP or INFORM message. The payload of this first message comprises at least one identifier of the switch and one identifier of the faulty port of the switch. In the signalling step 1010 the switch also updates 20 the status zone 120.2 of the working memory to write therein the "faulty" status in the recording corresponding to the faulty port.

From step 1010 the switch then passes to a step 1020 of updating the routing data in the working memory. This step is designated independent because it only uses local data, that is to say saved in memories of the switch and especially data produced by the switch.

In step 1020 of updating the routing data, the switch searches for, in the routing table zone 120.1 of the working memory of the switch, the routing recordings comprising the identifier of the faulty port in their destination identifier field.

For each of the recordings found, the switch replaces the value of the faulty port identifier by a value of an operational port identifier. This updating thus takes place in the working memory of the switch. This updating will not be propagated in the persistent memory of the switch. This signifies that if the switch starts again, this updating will be lost. It is a temporary update, but quickly carried out.

In certain switches, a routing table also exists in a memory of a specialised circuit. This specialised circuit, dedicated to routing management, is used for performance reasons. This specialised circuit then comprises its own copy of the routing data. For such a switch, in step 1020, the routing data of the specialised circuit is also updated. The memory of such a specialised circuit is not persistent. Such an updating is thus temporary.

The value of an operational port may be selected in several ways. A first mode for selecting a value is to choose the same value for all the updates. This selected value is then, for example:
  The first operational port identifier value found in the port status zone 120.2 of the working memory of the switch. In this case, the switch sequentially scrolls the recordings of the port status zone 120.2 of the working memory of the switch and stops as soon as it finds one of which the status field is "operational". The identifier value of the recording is then used for all the updates.
  The nth operational port identifier value found in the port status zone 120.2 of the working memory of the switch. In this case, the switch sequentially scrolls the recordings of the port status zone 120.2 of the working memory of the switch and stops as soon as it has counted N recording of which the status field is "operational". The identifier value of the recording on which the counting has stopped is then used for all the updates. The value of N is predetermined or chosen randomly by a pseudo-random function implemented by the switch.

A second mode for selecting a value is to choose a value dependent on the updated recording. In this mode, the updates are counted as they are carried out via a counter, a value is selected according to the first selection mode using the nth value, N being equal to the value of the counter. The port identifier value thus indeed changes for each new update.

Whatever the mode for selecting an operational port, it may be noted that the search may be restricted to a sub-set of the available operational ports. Such a sub-set is predetermined, for example by parameterisation, and makes it possible to accelerate the selection or to ensure greater pertinence of the selected port.

A notable difference between the first and second modes for selecting an updating value is that in the second mode the updating value is calculated for each update. The modes for selecting an updating value are not the only ones possible.

In an alternative embodiment of the invention, the data of the port status zone 120.2 is sorted before scrolling it, a sorted list is thus obtained which can be scrolled according to at least one of the modes described. A sorting takes place for example according to the port identifier, another sorting takes place according to the port status, yet another sorting takes place according to a port load information. Such a load information is obtained by scrolling the routing table zone 120.1 and by making an aggregation on the port identifier, which makes it possible to obtain, for each port identifier, the number of occurrences in the zone 120.1. This number of occurrences is the load of the port. In an alternative embodiment of sorting by port load, each modification of the zone 120.1 of the routing table to recalculate is considered, at the moment of the modification, the load of the port concerned, which modifies the sorting for potential later modifications.

Thus, if an alternative embodiment is considered sorted according to the predetermined load and rank equal to one, the port the least loaded is still selected.

It is clear that in the operations described, faulty ports are ignored.

In another alternative embodiment, which can be concurrent with the preceding embodiments, only a sub-set of ports for the selection of the operational port identifier is considered. A pre-selection is thus carried out. In particular, this pre-selection makes it possible to exclude, for example, descending ports. The fact that a port is descending is a characteristic of the port which is saved, for example, such as a typical field in the port status zone 120.2. Thus, for each port it is possible to manage additional characteristics. The typical characteristic is entered by configuration when the switch 100 is put in place.

Thus, a set of ports in which is selected an identifier is, for example:
  the set of all the working ports,
  a sub-set of the set of all the working ports according to a predetermined criterion such as the type of port.

Step 1020 of updating the routing data in the working memory is followed by a step 1030 of transmitting a second signalling message via the management port 140. The second signalling message is a message according to a SNMP protocol, for example a TRAP or INFORM message. The payload of this second message comprises at least one switch identifier and one description of the modifications made to the routing data in the working memory.

The first signalling message and the second signalling message are sent to a management server, not represented. The management server uses the payloads to compute new routing information before transmitting this new routing information to the switch which has transmitted the signalling messages.

Without the invention, the management server only has available one faulty port identifier. With the invention, it knows in addition which modifications have been made by the quick correction carried out by the switch. It can thus take into account these modifications in its computation. Such a taking into account is:
  A validation, that is to say the modification is good and thus there is no reason to transmit it again,
  A correction, that is to say the quick correction carried out, is not optimal and it is necessary to correct it.

Once its computation has been carried out, the management server sends a routing information updating message to the switch. Such an updating message is a response to the signalling messages. The production of such a routing information updating message takes, with or without the invention, at least ten or so seconds, but this time generally exceeds a minute for very large topologies, that is to say topologies of more than 50,000 computing nodes.

In a step 1040 of receiving a message for updating a routing table the switch 100 receives the message produced by the server. Such a message is usual for a switch. The processing of such a message consists in using the data of the message to update the routing data in all the memories of the switch using these data. In our example, this includes the working memory and the persistent memory. After the processing of this updating message, in a step 1050, if the switch starts again, the faulty switch will be correctly taken into account. The correction has been maintained.

In the case of the implementation, a switch managing routing data via two memories has been described. The invention remains valid for a switch using more memory. For example it is possible that the microprocessor 110 of the switch 100 is a specialised circuit comprising a dedicated ultra-quick memory in which it saves the routing information. In this case, the invention makes it possible to update quickly the dedicated memory, but neither the working memory nor the persistent memory. It is also possible only to update the dedicated memory and the working memory. The principle of the invention is to update only the memories involved in routing operations, that is to say the memories used by the microprocessor to determine a route.

Thus with the invention, these partial repairs are not intended to be optimal. The modes presented will succeed in forwarding the traffic arriving from the descending ports but cannot act upstream in order to avoid that traffic that was descending via a fallen port continues to be routed. In all cases, a more complete updating is going to follow, calculated by a routing module of the management server.

Also, the modifications carried out by a rapid repair according to the invention are not stored in the persistent memory: they are temporary.

This quick repair nevertheless makes it possible to avert applicative defects at the level of the computing nodes connected to the switch.

The invention claimed is:

1. A method for quick reconfiguration of routing in an event of a fault in a port of a switch, the method comprising:
   transmitting, by a switch, a first message to indicate a fault in a port of the switch, the switch comprising a plurality of ports, a persistent memory comprising a first routing table that comprises a plurality of routing recordings, and a working memory comprising a second routing table;
   maintaining a copy of the first routing table of the persistent memory in the second routing table of the working memory, wherein the persistent memory is different from the working memory and is connected to the working memory via a bus;
   independently updating, by the switch, routing data only in the second routing table of the working memory by replacing an identifier of the port with the fault with an identifier of an operational port, the identifier of the operational port being selected locally;
   transmitting, by the switch, a second message to indicate that the second routing table of the working memory is updated;
   receiving, by the switch, a routing table updating message; and
   using, by the switch, data of the routing table updating message in order to update the persistent memory, wherein said updating of the persistent memory is compliant with the data of the routing table updating message, and wherein the persistent memory is configured to back-up data in absence of power.

2. The method for quick reconfiguration according to claim 1, wherein the identifier of the operational port is selected from a set formed by identifiers of operational ports of a plurality of ports.

3. The method for quick reconfiguration according to claim 1, wherein the identifier of the operational port is selected randomly.

4. The method for quick reconfiguration according to claim 1, wherein the identifier of the operational port is selected according to a counter corresponding to a number of updates carried out.

5. The method for quick reconfiguration according to claim 1, wherein the identifier of the operational port is selected according to a predetermined ranking in a list of port identifiers.

6. The method for quick reconfiguration according to claim 1, wherein a list of ports used for selecting the identifier of the operational port is sorted.

7. The method for quick reconfiguration according to claim 6, wherein the sorting is based on a load of the ports.

8. A digital storage device comprising a file corresponding to instructions codes implementing the method according to claim 1.

9. A device configured to implement the method according to claim 1.

10. The method for quick reconfiguration according to claim 1, further comprising:
    identifying the identifier of the operational port from among a subset of other ports of the switch determined to be operational based on a predetermined criterion.

11. The method for quick reconfiguration according to claim 10, wherein the predetermined criterion is selected from among a group comprising a type of port.

12. The method for quick reconfiguration according to claim 1, wherein the first and second messages are sent to a management server, which uses payloads of said messages to compute new routing information before transmitting the new routing information to the switch in the routing table updating message.

13. The method for quick reconfiguration according to claim 1, wherein the first message is transmitted via a management port of the switch and wherein the management port is distinct from the plurality of ports of the switch.

14. The method for quick reconfiguration according to claim 1, wherein the first message comprises an identifier of the switch and the identifier of the port with the fault.

15. The method for quick reconfiguration according to claim 1, wherein the first message is transmitted according to a simple network management protocol (SNMP) standard.

16. The method for quick reconfiguration according to claim 1, wherein the second message is transmitted according to a simple network management protocol (SNMP) standard.

17. The method for quick reconfiguration according to claim 1, wherein the second message comprises an identifier of the switch and a description of the update made to the second routing table of the working memory.

18. The method for quick reconfiguration according to claim 1, wherein the routing table updating message is received by the switch in response to the transmitted first and second messages.

19. The method for quick reconfiguration according to claim 1, wherein the working memory includes information regarding a status of each of the plurality of ports.

\* \* \* \* \*